US008086475B2

(12) United States Patent
Chien et al.

(10) Patent No.: US 8,086,475 B2
(45) Date of Patent: Dec. 27, 2011

(54) INVESTMENT INSURANCE AUCTIONING METHOD AND SYSTEM THEREOF

(75) Inventors: Yung-Sung Chien, Taipei (TW); Frank Kuen-Bao Ling, Kaohsiung County (TW)

(73) Assignee: Shacom.Com Inc., Taipei (TW)

( * ) Notice: Subject to any disclaimer, the term of this patent is extended or adjusted under 35 U.S.C. 154(b) by 476 days.

(21) Appl. No.: 12/116,952

(22) Filed: May 7, 2008

(65) Prior Publication Data

US 2009/0063198 A1  Mar. 5, 2009

(30) Foreign Application Priority Data

Aug. 29, 2007  (TW) .................................. 96132060 A

(51) Int. Cl.
*G06Q 40/00* (2006.01)
(52) U.S. Cl. ............................................................ 705/4
(58) Field of Classification Search .................... None
See application file for complete search history.

(56) References Cited

U.S. PATENT DOCUMENTS

| 7,587,358 B2 * | 9/2009 | Hambrecht et al. ............. 705/37 |
| 7,640,202 B2 * | 12/2009 | Foti et al. ..................... 705/36 R |
| 7,734,484 B2 * | 6/2010 | Lutnick et al. ................... 705/4 |
| 2005/0027626 A1 * | 2/2005 | Garcia ............................ 705/35 |
| 2005/0137953 A1 * | 6/2005 | McDonough et al. .......... 705/36 |
| 2005/0149436 A1 * | 7/2005 | Elterich ......................... 705/39 |

FOREIGN PATENT DOCUMENTS

| TW | 096103570 | 1/2007 |
| TW | 096116081 | 3/2007 |

OTHER PUBLICATIONS

The Insurance Role of Rosca in the Presence of Credit Markets: Theory and Evidence, Hanming Fangi and Rongzhu Kee, Nov. 23, 2006.*
The Insurance Role of ROSCA in the Presense of Credit Markets: Theory and Evidence, Hamming Fang and Rougzhu Ke, Nov. 23, 2006, 50 pages.*
You Can't Save Alone Commitment in Rotating Savings and Credit Associations in Kenya, Jan. 2005, Mary Kay Gugerty, 37 pages.*
Cash-Balance Plan Conversions: Evidence on Excise Taxes and Implicit Contracts, Greg Niehaus and Tong Yu, Journal of Risk and Insurance, V72, n2, pp. 321-352, Jun. 2005.*

* cited by examiner

*Primary Examiner* — Bruce I Ebersman
(74) *Attorney, Agent, or Firm* — Winston Hsu; Scott Margo

(57) ABSTRACT

A method for providing investment insurance, and a related system, for use in the insurance business of financial e-commerce provides a novel funding operation approach to investment insurance. The novel funding operation approach allows a user to select to expand credit, and increase return on investment, or select to deposit with zero risk. The system for investment insurance allows insurance companies to receive a surrender fee and eliminate interest risk, and the applicant may expand their credit to increase their return on investment for enhanced protection of their insurance policy.

10 Claims, 3 Drawing Sheets

INVESTMENT INSURANCE AUCTIONING METHOD AND SYSTEM THEREOF

BACKGROUND OF THE INVENTION

1. Field of the Invention

The present invention relates to investment-style insurance mechanisms, and more particularly, to a method and related system for handling an investment insurance policy through use of a capital bidding mechanism which allows participating users to win a bid to deposit money or raise funds for investment to expand credit, or opt out of bidding to take advantage of more stable interest rates. The insurance can exempt risk of the interest rate, and earn handling fees to provide stronger protection for the insured party.

2. Description of the Prior Art

As the Internet increases in speed, security, and availability, new products and services are being developed daily to meet the demands of consumers who are growing accustomed to making all manner of business transactions online from the comfort of their home. Today, online brokers, banks, and funds offer a large variety of high-yield, high-return investment products. The insurance industry is also incorporating investment strategies into their policy offerings. Previously, insurance policies resembled black holes, where premiums were paid up front and only come back out if disaster struck. Some insurance policies now offer returns on premiums already paid, such that capital remains active while it is in the policy. Examples of such new types of insurance policy include savings style insurance, participating insurance, and investment style insurance, which are rapidly taking over a market originally dominated by traditional insurance policies.

However, these new types of insurance policies are offered to the consumer at a certain risk on the interest to the insurance company. For example, ten years ago, Cathay Life put out a principal-protected 5% fixed rate savings style insurance plan, which attracted a tremendous number of policy buyers. However, as rates have dropped sharply in recent years, the promised 5% fixed rate has placed a great financial burden on Cathay Life. This example illustrates risk to the insurance company, but the consumer also takes a risk when selecting the insurance policy, depending on market conditions over the life of the insurance policy. Typically, once the terms of the policy are set, the consumer is bound by the terms, and may lose their ability to take advantage of favorable market conditions, or to avoid unfavorable market conditions, by adjusting the terms of their policy. For example, in a bear market, the savings style insurance policy may be attractive, whereas the savings style insurance policy may seem like a frozen asset when markets are hot. Conversely, the investment style policy may be very satisfying when the economy is strong, but likewise may feel like a bomb that could explode at any minute during a recession.

U.S. Pat. No. 5,655,085 (hereafter '085), titled "Computer System for Automated Comparing of Universal Life Insurance Policies Based on Selectable Criteria," discloses a computer system used for quickly providing consumers with universal life insurance policies optimized for specific needs of the consumers, such as a low premium. This increases bid selection efficiency for investment style policies. However, although '085 provides increases in speed and convenience to the consumer as far as selecting a policy, investment is always accompanied by risk, and the consumer should be presented with information about loss that may be associated with prevailing market conditions. '085 fails to provide a capital shelter for the policy-holder, while also failing to reward the policy-holder with increased credit and opportunities for better investment returns when the policy-holder invests wisely based on their accurate appraisal of market conditions.

U.S. Pat. No. 6,049,772 (hereafter '772), titled "System for Managing Hedged Investments for Life Insurance Companies," discloses a system for mitigating risk to the policy holder and the insurance company through analyzing investments related to individual policies, and purchasing corresponding options, calls, and other hedging vessels. The amount of risk allowed can be set with "caps and floors." Although hedging effectively reduces investment risk related with the insurance industry, it is unable to eliminate the investment risk. Further, hedging necessarily decreases the operating position of the main product, thus reducing overall returns. Investment derivative products are also influenced by different regulations in different countries, which makes '772 hard to implement. Thus, '772 does not provide an ideal method for reducing risk in investment style insurance policies.

U.S. Patent Application 2002/0165740 (hereafter '740), titled "Investment Style Life Insurance Product that Allows Consumer to Control and Replace Individual Policy Components," gives policy-holders an option to transfer their term life insurance policy to an investment style policy. The policy-holder may also transfer assets, liabilities, and rights to the investment style policy provider, and the investment style policy will be adjusted to include the assets, rights, and liabilities, or similar assets, rights and liabilities, thus allowing the policy-holder to control and adjust which types of assets, rights, and liabilities underlie the policy. This allows the policy-holder to connect personal assets to their policy, but also limits the investment scope of the policy, and does not allow the policy-holder to expand their credit. Further, '740 is only practical for use with customers who have large personal wealth, and cannot meet the needs of normal consumers.

Thus, the prior art while attempting to mitigate risk associated with investment style insurance policies, particularly the risk of interest rate traditionally ailing the insurance industry, which may induce bankruptcy of the insurance company, is unable to provide a solution that simultaneously mitigates the risk, is broadly applicable to all levels of investment, and does not allow policy-holders to expand their credit off of their policy investments. In other words, the policy-holders of the insurance style policies of the prior art are still open to risk, unable to take advantage of both savings and investment, and further experience an indirect loss due to their inability to take advantage of credit expanding opportunities based off of their investment.

SUMMARY OF THE INVENTION

It is therefore an objective of the present invention to provide a method for investment insurance and a system thereof, to solve the above-mentioned problems to expand credit and enhance investment.

According to one embodiment of the present invention, a method of investment insurance that utilizes a capital bidding mechanism for a user to perform bidding to expand user credit and enhance investments, or opt out of bidding and earn interest comprises processing participation of the user in the capital bidding mechanism, and settling an asset balance of the user according to at least one of a coverage of an insurance policy and a bidding result of the capital bidding mechanism participated in by the user when the insurance policy of the user is terminated.

According to another embodiment of the present invention, an investment insurance system comprises a capital bidding mechanism module for processing a bid of a user participating in a capital bidding mechanism, and a claims and settlement transaction module for settling an asset balance of the user according to at least one of a coverage of an insurance policy and a bidding result of the capital bidding mechanism participated in by the user when the insurance policy of the user is terminated. The capital bidding mechanism is utilized for processing establishment of a bidding combination and receiving bids from users. The capital bidding mechanism also generates a winning member with a right to obtain a total of the bids based on amounts of the respective bids, and losing members responsible for continued deposit. The winning member is responsible for refund after winning. The capital bidding mechanism also provides a platform for the users to raise funds aggressively for increasing their credit and enhancing their investments, or adopting a conservative strategy of earning interest by not bidding according to each of the users' personal investment judgment.

According to one embodiment of the present invention, the claimed invention discloses a method of investment insurance that utilizes a capital bidding mechanism for a user to perform bidding to expand user credit and enhance investments, or opt out of bidding and earn interest. The method comprises processing participation of the user in the capital bidding mechanism; and settling an asset balance of the user according to a bidding result of the capital bidding mechanism participated in by the user when the insurance policy of the user is terminated and according to at least one of a coverage of an insurance policy.

According to one embodiment of the present invention, the claimed method further comprises determining a bid term of the capital bidding mechanism participated in by the user according to an insurance term of the insurance policy of the user.

According to one embodiment of the present invention, the claimed invention further comprises receiving an insurance electronic certificate application information of the user; an online verification organization performing an identity verification of the user by verifying the insurance electronic certificate application information to generate a verification result; receiving an insurance applicant information; and performing underwriting corresponding to the insurance policy to generate an electronic insurance policy for the user based on the verification result and the insurance applicant information.

According to one embodiment of the present invention, performing the guaranteeing operation is asking the user to provide collateral valued no less than total payment of the capital bidding mechanism, or a guarantor having net worth no less than the total payment of the capital bidding mechanism.

According to one embodiment of the present invention, the claimed method further comprises performing a guaranteeing operation to allow the user to obtain bidding qualification for participating in the capital bidding mechanism.

According to one embodiment of the claimed invention, processing the participation of the user in the capital bidding mechanism comprises depositing a deposit generated by the user participating in the capital bidding mechanism in an exclusive personal account; investing a winning bid amount generated when the user wins a bid; and depositing a reimbursement in the exclusive personal account after the user wins the bid.

According to one embodiment of the claimed invention, the exclusive personal account is a transitory account for the user to deposit and withdraw capital of the capital bidding mechanism.

According to one embodiment of the claimed invention, depositing the deposit generated by the user participating in the capital bidding mechanism in the exclusive personal account comprises the capital bidding mechanism converting the deposit of the user into a winning bid amount of a winning user for a bid period; and depositing the reimbursement in the exclusive personal account after the user wins the bid comprises the capital bidding mechanism converting the reimbursement of the user into the winning bid amount of the winning user for the bid period.

According to one embodiment of the claimed invention, processing the participation of the user in the capital bidding mechanism comprises depositing a deposit into an exclusive personal account according to a bidding result of the capital bidding mechanism when the user bids in the capital bidding mechanism and does not win a bid; and settling the asset balance of the user according to at least one of the coverage of the insurance policy and the bidding result of the capital bidding mechanism participated in by the user comprises settling an account balance of the exclusive personal account when the user terminates the insurance policy by rescinding the insurance policy before the insurance policy ends and the user has not won a bid.

According to one embodiment of the claimed invention, processing the participation of the user in the capital bidding mechanism comprises depositing a winning bid amount into an exclusive personal account of the user according to a bidding result of the capital bidding mechanism when the user participates in the capital bidding mechanism and wins a bid; and settling the asset balance of the user according to at least one of the coverage of the insurance policy and the bidding result of the capital bidding mechanism participated in by the user comprises settling an account balance of the exclusive personal account and paying off an unpaid obligation sum of a remaining period of the capital bidding mechanism when the user terminates the insurance policy by rescinding the insurance policy before the insurance policy ends and the user has won a bid.

According to one embodiment of the claimed invention, processing the participation of the user in the capital bidding mechanism comprises depositing a deposit into a fund bidding platform according to a bidding result of the capital bidding mechanism when the user participates in the capital bidding mechanism and has not won a bid; and settling the asset balance of the user according to at least one of the coverage of the insurance policy and the bidding result of the capital bidding mechanism participated in by the user comprises settling an account balance of the exclusive personal account and paying the coverage of the insurance policy when the user terminates the insurance policy by filing a claim before the insurance policy ends and the user has not won a bid before the insurance policy is terminated.

According to one embodiment of the claimed invention, processing the participation of the user in the capital bidding mechanism comprises depositing a winning bid amount in an exclusive personal account of the user according to a bidding result of the capital bidding mechanism when the user participates in the capital bidding mechanism and wins a bid; and settling the asset balance of the user according to at least one of the coverage of the insurance policy and the bidding result of the capital bidding mechanism participated in by the user comprises settling an account balance of the exclusive personal account, paying the coverage of the insurance policy, and paying off an unpaid obligation amount of a remaining period of the capital bidding mechanism when the user terminates the insurance policy by filing a claim before the insurance policy ends and the user has won a bid before the insurance policy is terminated.

According to one embodiment of the claimed invention, processing the participation of the user in the capital bidding mechanism comprises depositing a deposit into an exclusive personal account of the user according to a bidding result of the capital bidding mechanism when the user participates in the capital bidding mechanism and does not win a bid; and settling the asset balance of the user according to at least one of the coverage of the insurance policy and the bidding result of the capital bidding mechanism participated in by the user comprises settling an account balance of the exclusive personal account when the insurance policy terminates by ending and the user has not won a bid before or when the insurance policy ends.

According to one embodiment of the claimed invention, processing the participation of the user in the capital bidding mechanism comprises depositing a winning bid amount into an exclusive personal account of the user according to a bidding result of the capital bidding mechanism when the user participates in the capital bidding mechanism and wins a bid; and settling the asset balance of the user according to at least one of the coverage of the insurance policy and the bidding result of the capital bidding mechanism participated in by the user comprises settling an account balance of the exclusive personal account when the insurance policy terminates by ending and the user has won a bid before or when the insurance policy ends.

According to one embodiment of the claimed invention, an investment insurance system comprises a capital bidding mechanism module and a claims and settlement transaction module. The capital bidding mechanism module is utilized for processing a bid of a user participating in a capital bidding mechanism. The claims and settlement transaction module is utilized for settling an asset balance of the user according to at least one of the coverage of an insurance policy and a bidding result of the capital bidding mechanism participated in by the user when the insurance policy of the user is terminated. The capital bidding mechanism is utilized for processing establishment of a bidding combination, receiving bids from users, generating a winning member having a right to obtain a total of the bids based on amounts of the respective bids, the winning member being responsible for refund after winning, and losing members responsible for continued deposits, and providing a platform for the users to use the capital bidding mechanism to raise funds aggressively for increasing their credit and enhancing their investments or adopting a conservative strategy of earning interest by not bidding according to each of the users' personal investment judgment.

The present invention has the following advantages:

(1) The present invention breaks the insurance myth of return being proportional to risk. Accordingly, insurance companies take on responsibility for risk in exchange for returns. However, the insurance companies not only face the insurance risk, but further face interest risks. In addition, the interest risk is a significant difficulty faced by conventional life insurance companies. During low interest periods, the investment benefit does not outweigh the predetermined interest promised in the insurance policy by the insurance companies. As a result, the present invention eliminates the interest risk, earns the handling charge, changes administration type of conventional life insurance businesses, and solves the interest risk of conventional life insurance businesses via the capital bidding mechanism.

(2) For expanding credit, the present invention is a form of financial e-commerce. The applicant collects funds to perform an investment to generate results for expanding credit according to his/her risk profile via the capital bidding mechanism constructed by the insurance company.

(3) One objective of the present invention is to allow the insurance company to cover only a portion of risk. From the standpoint of cash flow, future cash flow of the business is positive. As a result, the present invention not only decreases net value of the insurance company, but also enhances embedded value of the insurance company.

(4) In response to prevailing interest rates and market capitalization levels, the present invention may respond to funding demands of the financial market. When the financial market is bullish, or when the need for funding is rejuvenated, the interest rate may rise. On the other hand, when the financial market is bearish, or the need for funding is low, the interest rate may fall. As a result, the present invention may respond in real time to the prevailing interest rate and funding demands.

(5) For offering protection, savings, and investment functions, the present invention changes the mode of the conventional insurance from having a fixed interest rate and guaranteed return, to providing a savings and capital raising approach for the applicant. In other words, the present invention not only provides a fixed guaranteed return when an insurance claim is exercised, but also has protection, savings and investment functions.

(6) For providing a widely adoptable, personalized product design, the present invention offers a customized product design for satisfying demands of applicants with various requirements, personal characteristics, and risk tolerances.

(7) For decreasing credit risk, the present invention sets a collateral security to decrease the probability of default by applicants having high risk and high return attributes, thereby decreasing the credit risk of operations of the capital bidding mechanism.

(8) For utilizing characteristics of the Internet for decentralization, the present invention utilizes the decentralized nature of the Internet to construct the capital bidding mechanism to create an insurance system and method for direct financing on the Internet.

(9) For overcoming problems of information disparity, in general, structures of the various insurance products offered by insurance companies are more complex and have lower information transparency, creating a situation where the applicant is usually inadequately informed or educated on the insurance product. However, the present invention overcomes the problems of conventional information disparity to provide a system and method with high information transparency and novel investment insurance.

(10) The present invention sets up an exclusive personal account for the applicant to manage funds accumulation of the applicant. Accordingly, the deposit site has characteristics of a trust asset. If the insurance company experiences a financial crisis or bankruptcy, the deposited assets of the applicant may not be affected at all.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not in function. In the following discussion and in the claims, the terms "including" and "comprising" are used in an open-ended fashion, and thus should be interpreted to mean "including, but not limited to . . . " The terms "couple" and "couples" are intended to mean either an indirect or direct electrical connection. Thus, if a first device couples to a second device, that connection may be through a direct electrical connection, or through an indirect electrical connection via other devices and connections.

Figure 1:
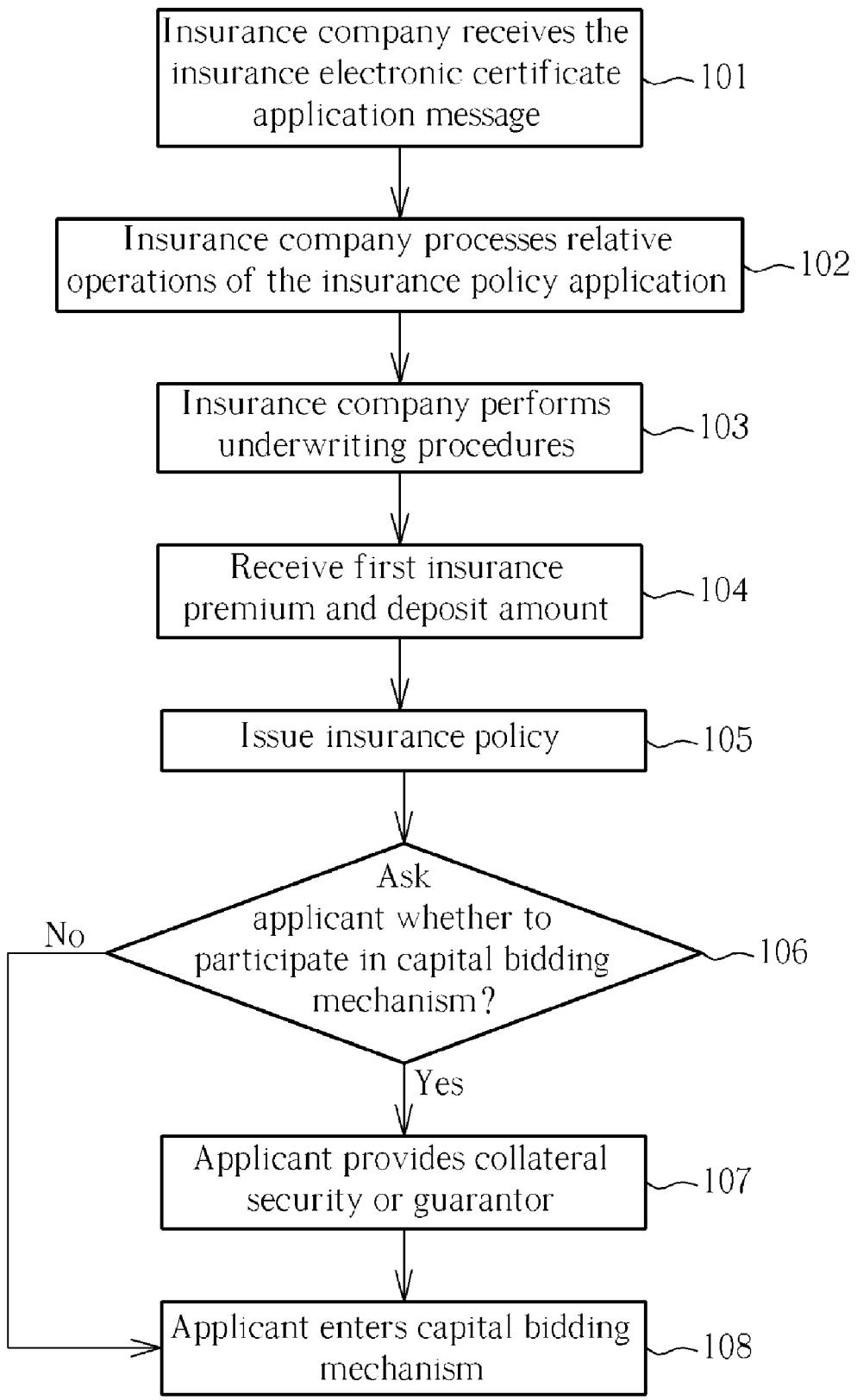
FIG. 1 is a flowchart illustrating a method of providing investment insurance according to an embodiment of the present invention.

Please refer to FIG. 1. FIG. 1 is a flowchart illustrating a method for providing investment insurance according to an embodiment of the present invention. As shown in FIG. 1, in Step 101, an insurance company receives an insurance electronic certificate application message. The insurance company cooperates with an Internet certificate institution and verifies basic information of an applicant, then issues the insurance electronic certificate for the applicant. Accordingly, the applicant sends an insurable application to the insurance company according to the insurance electronic certificate. In Step 102, the insurance company processes relative operations of the insurance policy application. In addition, in Step 103, the insurance company performs underwriting procedures, wherein the underwriting procedures include verifying the basic data, financial background, and insured amount of the applicant and insured. Then, in Step 104, the insurance company receives a first insurance premium and deposit amount. After the insurance company receives the first insurance premium and deposit amount, the insurance company creates an electronic insurance policy, and in Step 105, a third auditing organization issues the electronic insurance policy to the applicant (becoming hereinafter the "applicant"). Accordingly, in Step 106, the insurance company asks the applicant whether he/she wishes to participate in a capital bidding mechanism. If a result of Step 106 is true (yes), then in Step 107, the applicant needs to provide a collateral security or a guarantor. In Step 108, the applicant enters the capital bidding mechanism and participates in the competitive funding operations of the capital bidding mechanism. If the result of the Step 106 is false (no), the flow goes to Step 108, where the applicant directly enters the capital bidding mechanism, and the applicant becomes a depositor, wherein the capital bidding mechanism is bid upon by the applicant. First, the capital bidding mechanism sets a contribution amount for each term, a payment interval, and payment terms. The contribution amount of each term multiplied by the payment terms is a target funding, on which the applicant bids in the capital bidding mechanism. The applicant may bid on whether to pay installment interest, wherein the installment interest is a bid price placed by the applicant. In addition, the capital bidding mechanism calculates, analyzes and compares a plurality of bid prices to select at least one bid winner from the applicants participating in the capital bidding mechanism. If the applicant wins, the applicant may obtain a total payment receivable, wherein the total payment receivable is calculated by the following two equations according to order of paid interest:

If the interest is paid first:

$$An = (U - 1n) \times ((N \times n) + (U \times (n-1))). \quad \text{Equation (1)}$$

If the interest is paid later:

$$An = (U \times (N - n)) + (U \times (n-1)) + \sum_{i=1}^{n-1} li. \quad \text{Equation (2)}$$

In the above equations, 'An' represents a total amount of an nth term obtained by the bid winner in the capital bidding mechanism, 'U' represents a contribution amount, 'N' represents a number of terms, 'n' represents a placed term, 'i' is a number of a selected term, and 'In' represents an amount of a bid from a bid winner in the nth term. Namely, In is a valid bid price and also represents interest of each term offered by the member.

If the applicant does not win, the applicant may earn interest according to the bid price placed by the bid winner. Accordingly, to eliminate interest rate difference risk, the system aggregates the applicants to perform a calculation of the bid price, comparison of bid price, and recognition of the payment receivable according to law of large numbers, to select at least one bid winner from the applicants participating in the capital bidding mechanism. Bid losers and the applicants who do not participate in the capital bidding mechanism may earn interest by depositing the deposit amount into exclusive personal accounts. Then the system directs the total payment receivable into an investment operation process module to perform investment management, and saves the above-mentioned result into a database.

Figure 2:
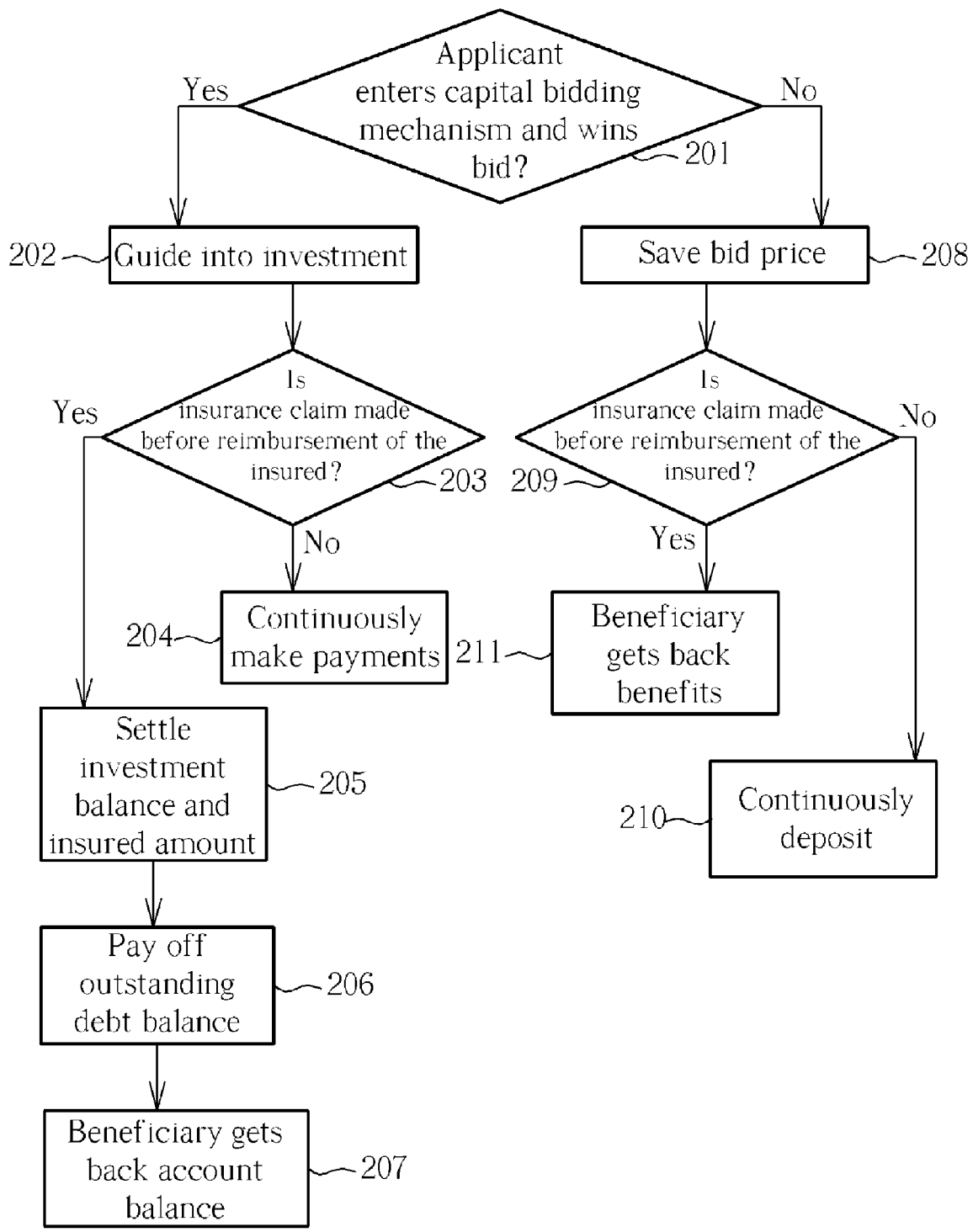
FIG. 2 is a funding analysis diagram illustrating an insurance claim and a deposit investment according to an embodiment of the present invention.

Please refer to FIG. 2. FIG. 2 is a funding analysis diagram illustrating an insurance claim and a deposit investment according to an embodiment of the present invention. As shown in FIG. 2, in Step 201, the applicant enters the capital bidding mechanism. The system notifies whether the applicant wins the bid. When the applicant wins the bid, in Step 202, the system directs the total payment receivable into an investment operation account, and the system receives a message indicating whether an insurance claim is made before reimbursement of the insured (Step 203). When the result of Step 203 is false, in Step 204, the applicant continues to make payments. On the other hand, in Step 205, the system settles the investment balance and the insured amount of the investment operation account of the applicant. In addition, in Step 206, the system pays off an outstanding debt balance and the above-mentioned settlement balance of the applicant in the capital bidding mechanism. Finally, in Step 207, the beneficiary gets back the account balance settled and paid off by the system. On the other hand, when the applicant does not win the bid or does not participate in the capital bidding mechanism, in Step 208, the applicant performs a deposit, i.e. depositing the bid amount. Then, in Step 209, the system receives the message indicating whether an insurance claim is made before reimbursement of the insured. When the result of Step 209 is false, in Step 210 the applicant continues performing deposits. On the other hand, when the result of Step 209 is true, the beneficiary receives the claim benefits amount in Step 211.

In addition, when the applicant enters the capital bidding mechanism and wins the bid, the capital bidding mechanism enters the total payment receivable into the exclusive personal account of the applicant. Then the system receives a message that indicates whether the applicant rescinds the insurance policy. When the result is false, the applicant continues to make payments. Otherwise, when the result is true, the system settles the investment balance of the exclusive personal account and insured amount. Accordingly, the system pays off the outstanding debt balance and the above-mentioned settlement balance of the applicant in the capital bidding mechanism. On the other hand, when the applicant does not win the bid, the insured continues to make deposits, and the system receives a message that indicates whether the applicant rescinds the insurance policy or not. When the result is false, the applicant continues making deposits. Otherwise, when the result is true, the system settles the account balance of the exclusive personal account.

Figure 3:
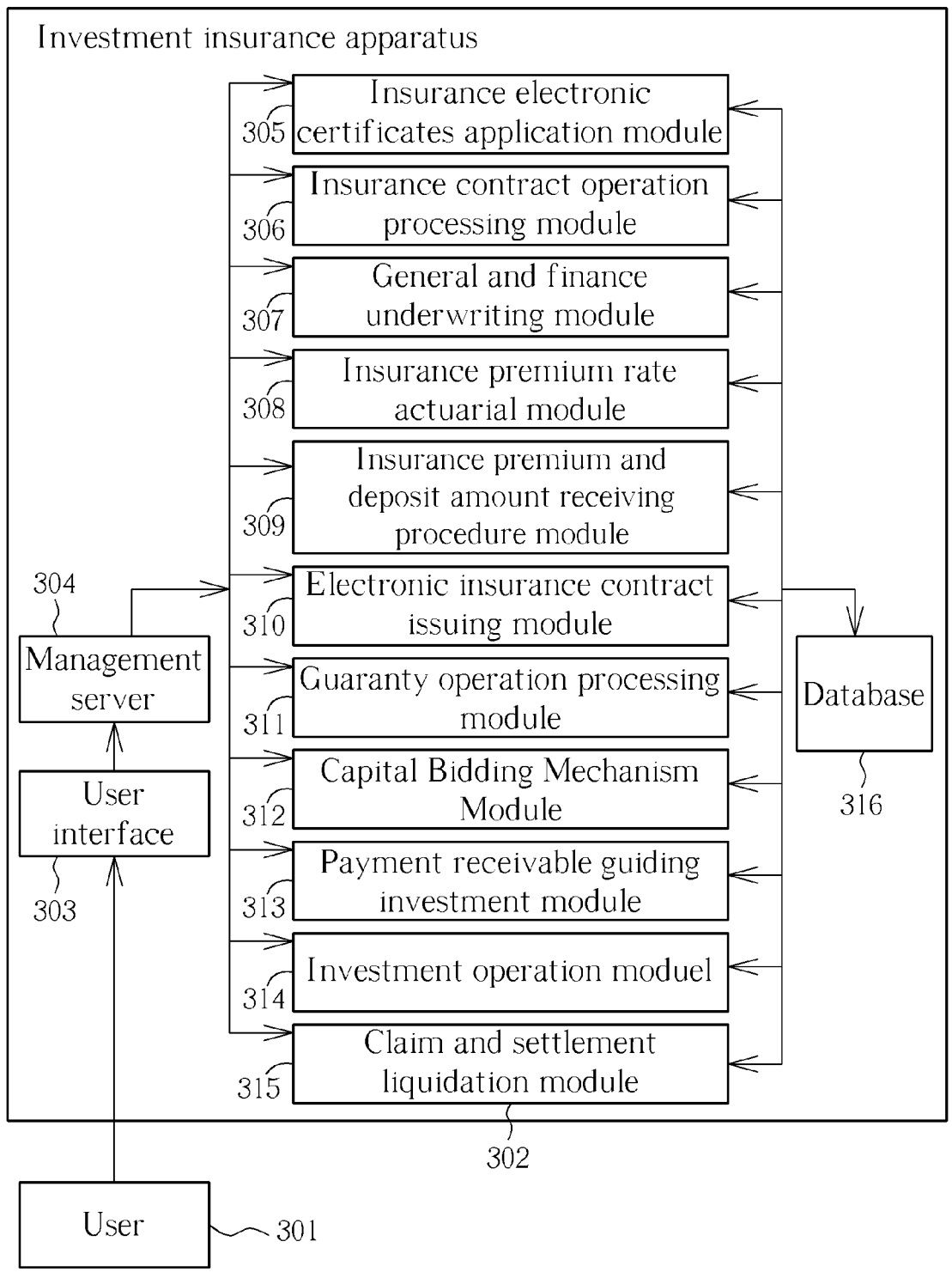
FIG. 3 is a block diagram illustrating an investment insurance system according to an embodiment of the present invention.

Please refer to FIG. 3. FIG. 3 is a block diagram illustrating a system for investment insurance according to an embodiment of the present invention. As shown in FIG. 3, the system 302 includes a server 304, for utilizing the Internet via a wired or wireless communication approach to provide a user 301 utilizing a computer, a mobile phone, or a personal digital assistant (PDA) access to connect with the server 304 through a user interface 303. Similarly, the server 304 connects with the user 301, wherein the server 304 exchanges a real-time secure message with the user 301, i.e. the applicant, through the Internet, the wired communication device, or the wireless communication device. Accordingly, the server 304 connects with a database 316 and various modules to save data, messages and results respectively into specific self-databases.

The investment insurance system 302 further includes the following modules. An insurance electronic certificate application module 305 is utilized by the server 304 to receive the insurance electronic certificate application messages of the user 301, and similarly to send the insurance electronic certificate application messages to an Internet identification organization, i.e. CA identification, to verify whether the application data of the user 301 is eligible for performing verification of the user's identity with the insurance electronic certificate. The server 304 returns the application result to the insurance electronic certificate application module 305, and notifies the user 301 of the verification result of the insurance electronic certificate. Moreover, after the server 304 calculates, processes, analyzes, cross-references, and executes the above-mentioned information, the investment insurance system 302 stores the above-mentioned information into the database 316. Thereafter, when the user 301 logs in to the investment insurance system 302 and performs operations, the insurance electronic certificate application module 305 may retrieve the information in real-time as management references.

An insurance contract operation processing module 306 is utilized by the server 304 to receive an insurable application message of the applicant for verifying and processing the insurable application message, and after the server 304 calculates, processes, analyzes, cross-references, and executes the above-mentioned information, the investment insurance system 302 stores the above-mentioned information into the database 316 as management references.

A general and finance underwriting module 307 is utilized by the server 304 to analyze and estimate health condition, medical information of the insured, and employment status, income level, and financial backgrounds of the applicant and the insured, and whether relations are reasonable between the insured amount and the contribution amount of the capital bidding mechanism participated in by the applicant. Moreover, after the server 304 calculates, processes, analyzes, cross-references, and executes the above-mentioned information, the investment insurance system 302 stores the above-mentioned information into the database 316 as management references.

An insurance premium rate actuarial module 308 is utilized by the server 304 to calculate a premium amount paid by the applicant according to insured conditions, risk level, and relative information of the insured and exacting insurance premium rate actuarial equations and an actuarial module. After the server 304 calculates, processes, analyzes, cross-references, and executes the above-mentioned information, the investment insurance system 302 stores the above-mentioned information into the database 316 as management references.

An insurance premium and deposit amount receiving procedure module 309 is utilized by the server 304 to receive and process insurance premiums paid by the applicant according to actuarial results of the insurance premium rate actuarial module 308 and the deposit amount calculated by a capital bidding mechanism module 312. After the server 304 calculates, processes, analyzes, cross-references, and executes the above-mentioned information, the investment insurance system 302 stores the above-mentioned information into the database 316 as management references.

An electronic insurance policy issuing module 310 is utilized by the server 304 to create the electronic insurance policy according to a processing result of the insurance policy operation and receiving status of the insurance premium. After signature encryption of the electronic insurance policy, the investment insurance system 302 uploads to the third audit organization and forwards and issues the electronic insurance policy to the applicant. After the server 304 calculates, processes, analyzes, cross-references, and executes the above-mentioned information, the investment insurance system 302 stores the above-mentioned information into the database 316 as management references.

A guaranty operation processing module 311 is utilized by the server 304 to process relative operations of the collateral security and the guarantor provided by the applicant who wants to participate in the capital bidding mechanism. Accordingly, the guaranty operation processing module 311 performs analysis, estimation and appraisal of the security collateral, and performs estimation and verification operations on the guarantor. After the server 304 calculates, processes, analyzes, cross-references, and executes the above-mentioned information, the investment insurance system 302 stores the above-mentioned information into the database 316 as management references.

A capital bidding mechanism module 312 provides a capital bidding mechanism to place a bid price for the user 301. The capital bidding mechanism sets a contribution amount for each term, a payment interval and payment terms. The contribution amount of each term multiplied by the payment terms is a target funding, which the applicant bids on in the capital bidding mechanism. The applicant may bid when the applicant wants to pay an installment interest, wherein the installment interest is a bid price placed by the applicant. In addition, the capital bidding mechanism calculates, analyzes and compares a plurality of bid prices to select at least one applicant from the applicants participating in the capital bidding mechanism as a bid winner. When the applicant wins, the applicant may obtain a total payment receivable, wherein the total payment receivable is calculated by the following two equations (repeated again for the reader's convenience) according to order of paid interest.

When the interest is paid first:

$$An = (U - 1n) \times ((N-n) + (U \times (n-1)) \qquad \text{Equation (1)}$$

When the interest is paid later:

$$An = (U \times (N - n)) + (U \times (n - 1)) + \sum_{i=1}^{n-1} Ii.  \quad \text{Equation (2)}$$

In the above equations, 'An' represents the total amount of the nth term obtained by the bid winner in the capital bidding mechanism, 'U' represents the contribution amount, 'N' represents the number of terms, 'n' represents the placed term, 'i' is the number of the selected term, and 'In' represents the amount of the bid from the bid winner in the nth term. Namely, In is the valid bid price and also represents the interest of each term offered by the applicant.

When the applicant does not win, the applicant may earn the interest according to the bid price placed by the bid winner. Accordingly, to eliminate the interest risk, the system combines the applicants to perform calculation of the bid price, comparison of bid prices, and recognition of the payment receivable according to the law of large numbers, to select at least one bid winner from the applicants participating in the capital bidding mechanism. The bid losers and the applicants not participating in the capital bidding mechanism then deposit the deposit amount into exclusive personal accounts accordingly to earn interest. The system directs the total payment receivable into an investment operation process module to perform investment management, and then saves the above-mentioned result into the database 316.

A payment receivable guiding investment module 313 is utilized by the server 304 to guide the total payment receivable (which is determined when the applicant participates in the capital bidding mechanism and wins the bid) into the exclusive personal account, wherein the exclusive personal account is a specific investment management account of the applicant. After the server 304 calculates, processes, analyzes, cross-references, and executes the above-mentioned information, the investment insurance system 302 stores the above-mentioned information into the database 316 as management references.

An investment operation process module 314 is utilized by the server 304 for performing investment and management for the total payment receivable won by the applicant in the capital bidding mechanism. The investment operation process module 314 further provides diverse investment management products for the applicant according to the risk tolerance and funding needs of the applicant. After the server 304 calculates, processes, analyzes, cross-references, and executes the above-mentioned information, the investment insurance system 302 stores the above-mentioned information into the database 316 as management references.

A claim and settlement liquidation module 315 is utilized by the server 304 to calculate a claim insurance amount and the investment operation account balance, and to perform a balance paying off function to allow a beneficiary to recover the account balance. After the server 304 calculates, processes, analyzes, cross-references, and executes the above-mentioned information, the investment insurance system 302 stores the above-mentioned information into the database 316 as management references.

Certain examples are given as follows to more clearly illustrate the technical features of the present invention. Please note that the following examples are for illustrative purposes only and are not meant to be limitations of the present invention.

As a first example, Mr. Lee studied classes on insurance in university, and deeply understands the importance of insurance for himself and his family. Therefore, upon graduation from college, he actively inquires after insurance policies corresponding to his financial ability and protection needs. However, because his monthly salary is only NTD32,000, he still scrimps on the insurance premium. Although the insurance premium of a conventional insurance policy is cheaper, under healthy and safe conditions, the insurance premiums paid are not recoverable. Accordingly, he feels that costs are significant. On the other hand, if Mr. Lee obtains an insurance policy with a deposit function, then the insurance premium of each term is a significant responsibility. If he selects an investment insurance policy, the rate of return connected to an investment target is not only volatile, but is also too low for guaranteed capital and guaranteed interest. With the above-mentioned problems in view, Mr. Lee learns of a novel insurance product on the news named 'investment insurance' now available on the market, which integrates investment deposit items of the investment insurance policy with a capital bidding mechanism like a rotating savings and credit association (ROSCA, "friendly society"). The investment interest of the insurance policy is controlled by the applicant, and the capital bidding mechanism has direct financing characteristics. Regardless of how high or low interest rates are in the market, the interest obtained by the applicant will be better than the deposit interest in ordinary banks. If the applicant does not place a bid in all insured periods, i.e. acting purely as a depositor, the rate of return obtained by the applicant is far more steady than a conventional investment insurance policy from an insurance company. On the other hand, if the applicant wants to participate in the capital bidding mechanism, then the applicant needs to provide a collateral security to obtain the right to participate in the capital bidding mechanism. After the applicant wins a bid, the insurance company automatically directs the payment receivable into an exclusive personal account to perform investment in financial products. Accordingly, in this situation, the applicant earns interest before the applicant wins the bid, and after the applicant wins the bid, the applicant obtains opportunities to invest in the financial products. As a result, all of the investment selections are better than the ordinary investment insurance policy.

Mr. Lee buys an 'investment insurance' policy from the insurance company by means of an electronic certificate over the Internet. The insured period is 6 years, the beneficiary is his father, the insurance amount is NTD720,000, and the insured item selected is six-year life insurance. Accordingly, the investment item of the investment insurance policy is linked to a capital bidding group for 6 years with a total contribution amount of NTD$720,000. Mr. Lee takes a monthly payment approach. He participates in a funding trade platform in which the unit contribution amount is NTD$10,000/month. The monthly paid insurance premium and deposit amount are formed in two parts: a fixed insurance premium, and the deposit amount. The latter is determined by the bid price of the capital bidding group participated in by Mr. Lee, but the deposit amount must be less than or equal to the unit contribution amount of NTD$10,000/month. Accordingly, after a first insurance premium paid by Mr. Lee is underwritten successfully, he receives the electronic insurance policy issued by the insurance company. In addition, the insurance company asks Mr. Lee whether he would like to participate in the capital bidding mechanism on the next page of the electronic insurance policy. If the answer is yes, Mr. Lee needs to provide the collateral security first, and after five days, Mr. Lee obtains his family's agreement, and then utilizes a savings account holding NTD$750,000 saved by his family as collateral to qualify for bidding on the platform.

On the 19$^{th}$ month of the investment insurance policy, Mr. Lee wins the bid on the funding trade platform, and the insurance company directs the payment receivable into his exclusive personal account to make investments with the guaranteed capital and the guaranteed interest. Therefore, Mr. Lee remits the monthly contribution amount of NTD$10,000 from the 20$^{th}$ month to the 54$^{th}$ month (a total contribution amount is NTD$350,000 TWD) to the insurance company. However, at the end of the 54$^{th}$ month, Mr. Lee has an automobile accident from drunk driving, and dies on the way home. As a result, the insurance company settles an insured claim amount of NTD$720,000, and a capital and interest of the investment of the insurance policy is NTD$795,582, minus an amount of NTD$175,609 corresponding to a payment amount of NTD$180,000, which Mr. Lee originally would have to pay the insurance company from the 55$^{th}$ month to the 72$^{th}$ month. Accordingly, the insurance company pays NTD$1,340,973 (NTD $720,000+$795,582−$175,609=NTD $1,339,973) to Mr. Lee's father, and returns the collateral provided by Mr. Lee to Mr. Lee's family.

In a second example, Mr. Lee was a subordinate of Mr. Chang. After Mr. Lee mentions the 'investment insurance' to Mr. Chang, Mr. Chang buys 10-year life insurance with an insurance amount of NTD$3,000,000. Accordingly, the protection selected by Mr. Chang is life insurance for a period of 10 years, the insurance premium is paid monthly, the investment item of the insurance policy is connected to a capital bidding group for 10 years, the unit contribution amount is NTD $20,000, and the total contribution amount would be NTD $2,400,000. Mr. Chang takes the monthly payment approach. In addition, Mr. Chang selects pure deposit, and does not participate in the platform for bidding. As a result, Mr. Chang does not have to provide collateral to the insurance company.

Mr. Chang pays off the insurance premium and the deposit amount in the 61$^{st}$ month, but the company where Mr. Chang works declares bankruptcy and disbandment, and Mr. Chang faces mid-life unemployment. Mr. Chang has many years of work experience, and feels he will quickly find a new job. Accordingly, he continues to pay the insurance premium and the deposit amount until the 66$^{th}$ month. However, Mr. Chang begins to realize that his professional knowledge and skills belong to a dying industry in Taiwan, and that he must learn a new skill for at least one year to get a job again. Consequently, Mr. Chang decides to rescind the insurance policy before endowment of the insurance policy, and gets back the paid deposit amount for the years he had paid in order to provide for his family. The deposit amount has accumulated to NTD$1,109,460 in Mr. Chang's exclusive personal account by the end of the 66$^{th}$ month. In addition, the insurance company calculates the interest on the deposit amount of NTD$1,109,460, and pays the deposit amount of NTD$1,224,933 to Mr. Chang.

In yet a third example, Mr. Fang is Mr. Chang's college friend. In the same year, Mr. Fang follows Mr. Chang's example by purchasing the 'investment insurance.' Mr. Fang selects 12-year life insurance with an insured amount of NTD$4,000,000, with the insurance premium paid annually. Accordingly, the investment item of the insurance policy is connected to a capital bidding group for 12 years, the unit contribution amount is NTD$20,000, and the total contribution amount is NTD$2,880,000. Because he is a high-tech research and development engineer, he has no time to participate in the capital bidding mechanism, and therefore he selects pure deposit. If a bidder wins the bid with NTD$2,000, Mr. Fang pays only NTD$18,000, thereby earning NTD$2,000 in interest. In addition, Mr. Fang also does not participate in the capital bidding mechanism, and therefore does not need to provide collateral.

Furthermore, Mr. Fang's job is steady and his life goes smoothly. As a result, he pays the insurance premium each year and the deposit amount on time each month. In the 143$^{rd}$ month, Mr. Fang pays the final premium of the investment insurance policy. When the insurance policy matures in the 144$^{th}$ month, Mr. Fang receives the deposit amount of NTD$2,880,000 in the exclusive personal account.

Compared to the prior art, the present invention provides an investment insurance policy and system which allows for users to adjust their investment strategy to match prevailing market conditions, opting for more aggressive investments during bull markets, and more conservative investments during bear markets. Adjustment is accomplished through the capital bidding mechanism, which the user may take advantage of to rapidly raise funds for investment, or may opt out of to take advantage of more stable interest rates.

Those skilled in the art will readily observe that numerous modifications and alterations of the device and method may be made while retaining the teachings of the invention.

What is claimed is:

1. A method of insuring investment using a server system, comprising:

receiving electronically an insurance certificate and an insurance application by the server system, wherein both the insurance certificate and the insurance application are provided by an applicant;

implementing a capital bidding mechanism by the server system, wherein the capital bidding mechanism comprises determining a contribution amount of each payment term, a payment interval, and a number of payment terms;

receiving a bid price for bidding on a total payment receivable by the server system, wherein the bid price is paid by the applicant and provided to the capital bidding mechanism according to the insurance certificate;

calculating, analyzing, and comparing a plurality of bid prices by the server system to select an applicant from applicants participating in the capital bidding mechanism as a bid winner, the bid winner having a highest bid among the applicants participating in the capital bidding mechanism, and performing an investment management process for the bid winner by the server system;

depositing the total payment receivable into an investment management account of the bid winner by the server system for performing an investment operation process on the investment management account; and depositing a deposit amount at an exclusive personal account by the server system for each applicant who neither wins the bid nor participates in the capital bidding mechanism;

wherein the bid winner is anticipated to make a repayment at each of the remaining payment terms of the capital bidding mechanism;

wherein a total payment is determined as follows:

$$An=(U-ln)\times((N-n)+(U\times(n-1)))$$

wherein 'An' indicates the total payment at the n-th payment term, 'N' indicates the number of payment terms, 'n' indicates a placed payment term, 'ln' indicates an amount of the winning bid from the bid winner at the n-th payment term; and wherein the deposit amount is determined to be equal to (U-ln), and the repayment is determined to be U.

2. The method of claim 1 further comprising:
receiving a message by the server system, wherein the message indicates whether an insurance claim is made by the applicant; and
determining a payment to a beneficiary of the bid winner to be equal to an insured claim amount plus a sum of a capital and an interest of an investment of an insurance policy and minus a discounted payment which is determined by discounting a repayment of the bid winner in the succeeding terms under the capital bidding mechanism by the server system.

3. The method of claim 1, further comprising:
determining an available the payment interval for the applicant by the server system according to an insured period provided from the applicant; and
processing an guaranty operation by the server system for qualifying whether the applicant is qualified to issue the bid price under the capital bidding mechanism.

4. The method of claim 1, wherein the exclusive personal account is a transitory account for the user to deposit and withdraw capital of the capital bidding mechanism.

5. A server system for insuring investment, comprising:
a computer processor for converting data and for executing computer instructions contained in the following software modules;
an insurance electronic certificates application software module for receiving electronically an insurance certificate and an insurance application, wherein both of the insurance certificate and the insurance application are provided by an applicant;
a capital bidding mechanism software module for implementing a capital bidding mechanism comprising determining a contribution amount of each payment term, a payment interval, and a number of payment terms, for receiving a bid price for bidding on a total payment receivable, and for calculating, analyzing, and comparing a plurality of bid prices by the server system to select an applicant from applicants participating in the capital bidding mechanism as a bid winner, the bid winner having a highest bid among the applicants participating in the capital bidding mechanism, wherein the bid price is paid by the applicant and provided to the capital bidding mechanism according to the insurance certificate;
an investment operation software module for performing an investment management process for the bid winner; and
payment receivable guiding investment software module for depositing the total payment receivable into an investment management account of the bid winner for performing an investment operation process on the investment management account, and for depositing a deposit amount at an exclusive personal account for each applicant, who neither wins the bidding nor participate in the capital bidding mechanism;
wherein the bid winner is anticipated to make a repayment at each of the remaining payment terms of the capital bidding mechanism;
wherein a total payment is determined by the capital bidding mechanism software module as follows:

$$An=(U-ln)\times((N-n)+(U\times(n-1))$$

wherein 'An' indicates the total payment at the n-th payment term, 'N' indicates the number of payment terms, 'n' indicates a placed payment term, 'ln' indicates an amount of the winning bid from the bid winner at the n-th payment term; and
wherein the deposit amount is determined to be equal to (U-ln), and the repayment is determined to be U.

6. The server system of claim 5, further comprising:
an insurance contract operation processing software module for receiving a message indicating whether an insurance claim is made by the applicant.

7. The server system of claim 5, further comprising:
a claim and settlement liquidation software module for determining a payment to a beneficiary of the bid winner to be equal to an insured claim amount plus a sum of a capital and an interest of an investment of an insurance policy and minus a discounted payment, wherein the discounted payment is determined by discounting a repayment of the bid winner in the succeeding payment terms under the capital bidding mechanism.

8. The server system of claim 5, further comprising:
a guaranty operation processing software module for processing an guaranty operation for qualifying whether the applicant is qualified to issue the bid price under the capital bidding mechanism.

9. The server system of claim 5, wherein the capital bidding mechanism software module is configured to determine an available the payment interval for the applicant by the server system, according to an insured period provided by the applicant.

10. The server system of claim 5, wherein the exclusive personal account is a transitory account for the user to deposit and withdraw capital of the capital bidding mechanism.

* * * * *